March 19, 1957     K. B. R. WOSSE     2,785,641
FOOD SHAPER HAVING REMOVABLE MOLDING CUPS
Filed March 16, 1954     2 Sheets-Sheet 1
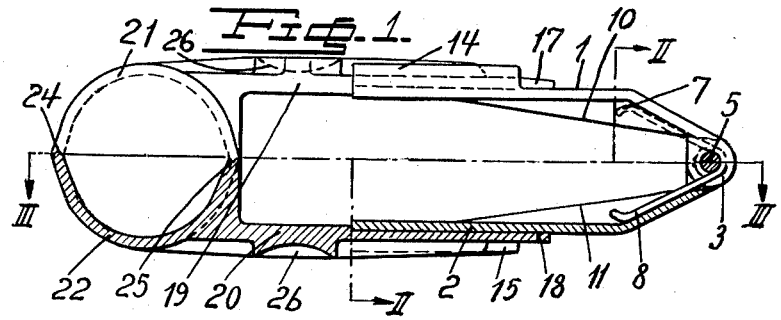
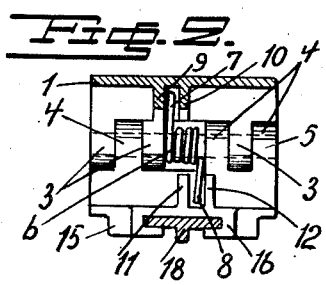
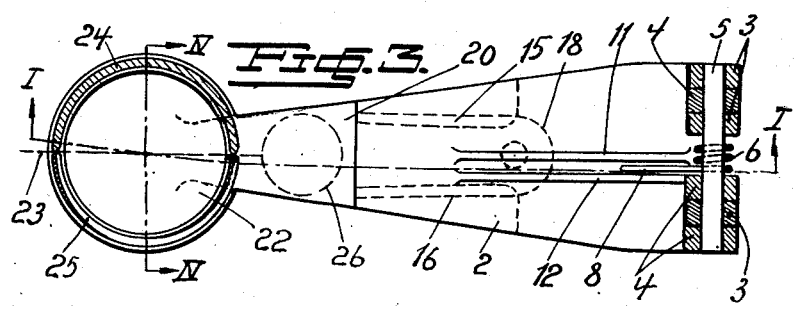
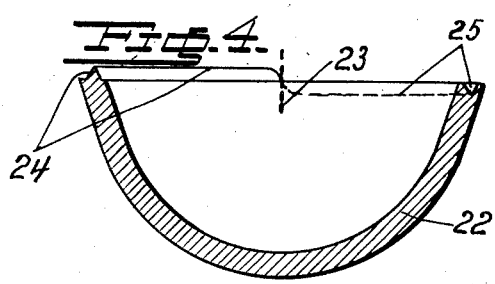
Inventor
Karl Birger Rudolf Wosse
by Sommers & Young
Attorneys March 19, 1957 K. B. R. WOSSE 2,785,641
FOOD SHAPER HAVING REMOVABLE MOLDING CUPS
Filed March 16, 1954 2 Sheets-Sheet 2
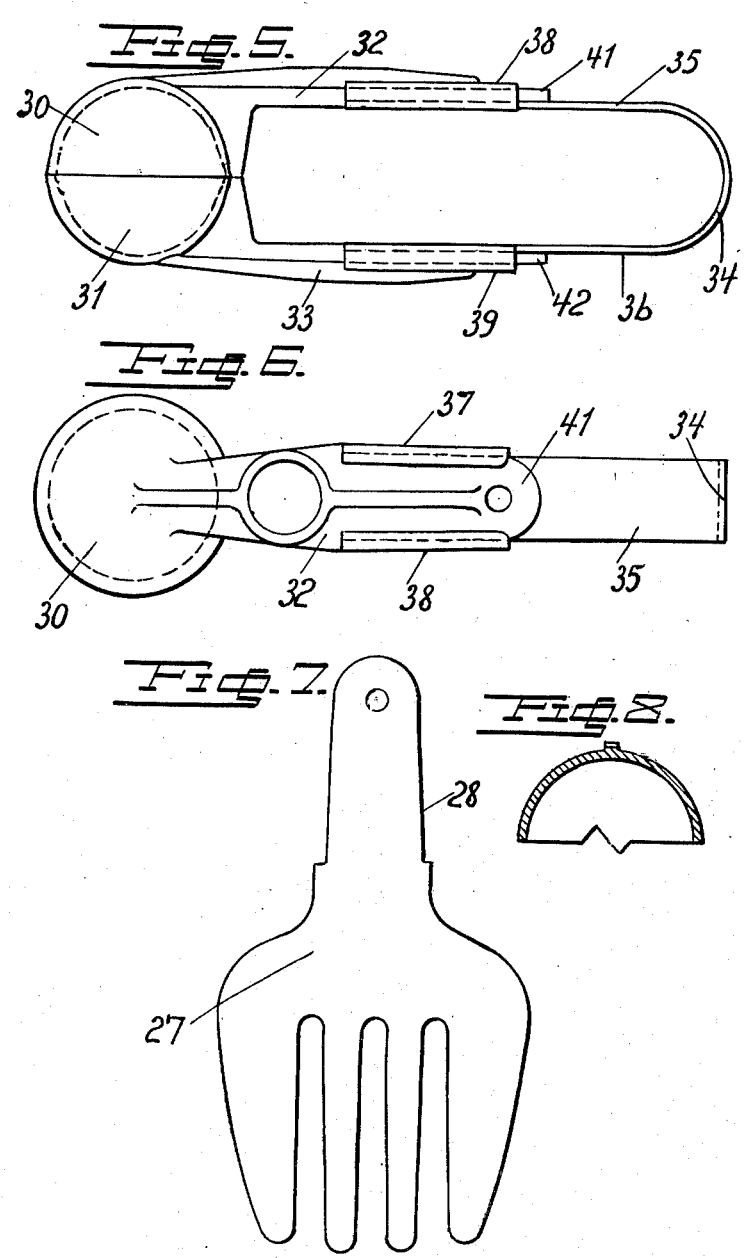

United States Patent Office 2,785,641
Patented Mar. 19, 1957

2,785,641

FOOD SHAPER HAVING REMOVABLE MOLDING CUPS

Karl Birger Rudolf Wosse, Solna, Sweden

Application March 16, 1954, Serial No. 416,647

1 Claim. (Cl. 107—48)

This invention relates to a meat ball shaper, which can also be used as a salad server or the like. The meat ball shaper according to this invention can also be used to shape other foodstuffs, such as fish balls, ice cream balls, or butter balls. The meat ball shaper is provided with semi-spherical cups, the rims of which are arranged to be moved towards one another with exact centering by means of two levers which are hinged to each other and are swingable towards each other against the action of a spring.

The meat ball shaper according to this invention is mainly characterized in, that the cups are exchangeable and that their circular end rim around the opening is provided on one side of the longitudinal diameter with a circumferentially extending edge having a V-shaped cross section and on the other side of said diameter of a circumferential groove with corresponding cross section. Each edge is arranged so as to engage with the groove in the end rim of the opposite cup, forming cutting faces in co-operation with the groove when the end rims of the cups are pressed together.

The principle of the invention is explained more closely in the following text, which describes two embodiments of the meat ball shaper according to the invention, further features of the invention being disclosed at the same time.

The description refers to the accompanying drawings, in which

Fig. 1 is a side view of the first embodiment with the lower half thereof in vertical and longitudinal section along the line I—I in Fig. 3, Fig. 2 shows the same embodiment in vertical cross section along the line II—II in Fig. 1, Fig. 3 shows the lower half of the same embodiment in plan view and partly in horizontal section along the line III—III in Fig. 1, Fig. 4 shows, on a larger scale, a vertical cross section along the line IV—IV in Fig. 3 of the lower cup, Fig. 5 is a side view of the other embodiment and Fig. 6 is a plan view thereof.

Fig. 7 is a forked catching means, which can be substituted for the cups when the meat ball shaper is to be used as a salad server.

Fig. 8 shows in vertical section a modification of one shaper cup.

The meat ball shaper disclosed in Figs. 1–4 is provided with two identically similar levers 1, 2, which can be produced of metal or synthetic material, for instance plastic, in the same mould. At one end thereof, the levers are provided with hinge pin eyes 3, and 4, respectively, receiving a hinge pin 5, so that the levers are hinged together. A screw spring 6 is pushed over the middle portion of the pin 5 between the inner eyes, the ends 7, 8 of said spring being extended substantially in tangential direction and pressing against the internal surfaces of the levers 1, 2. Each spring end 7 and 8 is placed between two longitudinally extending reinforcing fins 9, 10 and 11, 12 respectively. On the outside of the free end portions of the levers are fitted two longtudinally extending foldings 13, 14, and 15, 16 respectively, which are folded in towards each other and converge slightly in the direction towards the hinge. The slightly narrowing end portion 17, and 18 respectively, of a handle 19, and 20 respectively, can be clamped between the foldings on each lever. Said handle extends from a semi-spherical cup 21, and 22 respectively, the hollow of which expands conically towards the cup rim. The cups and their handles are identically similar and can thus be moulded of metal or plastic in the same mould. On one side of the longitudinal cup diameter, which is indicated by a dash line 23, the cup rim is formed with a circumferentially extending edge 24 of triangular cross section. On the other side of the diameter 23, the cup rim is provided with a circumferentially extending groove 25 of the same triangular cross section. Each edge 24 is so placed that it enters the groove 25 in the rim of the opposite cup, co-operating with the groove as cutting faces when the cup rims are pressed together through the swinging of the levers toward each other against the action of spring 6. Cup-shaped finger supports 26 are provided in the outer sides of the handles 19, 20.

The cups 21, 22 are detachable and can thus easily be replaced with cups of various designs and dimensions, or with fork-shaped or spoon-shaped catching means, so that the meat ball shaper can be used as salad server or the like. Fig. 7 shows, in plan view, a salad fork 27, the handle 28 of which is identically similar to the handles 19, 20 of the cups 21, 22.

Figs. 5 and 6 show a second embodiment of the meat ball shaper. It is provided with cups 30, 31 and handles 32, 33, which are identically similar to the corresponding parts in Figs. 1 and 2. The hinged levers, the hinge and the screw spring of the first embodiment are in this case replaced with a U-shaped spring strap 34, which is made of a spring steel band, preferably of stainless steel. On each end portion of the two shanks 35, 36 the longitudinal edges are folded upwards and inwards so as to form slightly converging foldings 37, 38 and 39, 40 respectively on the outer sides of the shanks. These foldings are of the same kind as the foldings in the first embodiment, so that the narrowing end portions 41, 42 of the cup handles 32, 33 can be clamped therebetween.

In the modification of the shaper cup shown in Fig. 8, the co-operating edge and groove of the cup rim have been replaced with a tooth on the rim of one cup and a corresponding notch in the rim of the other cup. This arrangement may prove advantageous in some cases.

Of course the invention is not confined to the embodiments described above and illustrated in the drawings but may be varied in several other ways without abandonment of the inventional spirit.

I claim:

A disher of the type described comprising a pair of handles swingably connected at one end for swinging movement toward and from each other, means for resiliently urging the handles normally from each other, a pair of identically equal cup members provided each with an integral arm extending from the top portion of said cup member substantially parallel to a plane common to the rim of said cup member, the end portions of said handles opposite the connected ends thereof having each two lateral flange portions spaced apart and formed with longitudinal grooves confronting each other and slightly converging towards the connected ends of said handles to receive the free ends of said arms of said cup members correspondingly tapered to frictionally engage said grooves, the rim of each of said cup members being divided into two portions disposed at opposite sides of a diametrical plane at right angles to the swinging axis of said handles, one of said portions being formed with a circumferential groove of substantially triangular cross-section and the other of said portions being formed with a circumferential ridge of substantially triangular cross-section complementary to said groove of said first portion.

References Cited in the file of this patent

UNITED STATES PATENTS

| | | |
|---|---|---|
| 436,818 | Wiatt | Sept. 23, 1890 |
| 1,057,065 | Krist | Mar. 25, 1913 |
| 1,584,757 | Dow | May 18, 1926 |
| 1,775,571 | Romer | Sept. 9, 1930 |
| 1,852,254 | Midlam | Apr. 5, 1932 |
| 1,888,739 | Sanders | Nov. 22, 1932 |
| 2,670,234 | Roop | Feb. 23, 1954 |

FOREIGN PATENTS

| | | |
|---|---|---|
| 640,124 | Great Britain | July 12, 1950 |